United States Patent
Katikala et al.

(10) Patent No.: US 12,492,836 B2
(45) Date of Patent: Dec. 9, 2025

(54) SMART ENERGY MANAGEMENT OF THE HEATING, VENTILATION, AND AIR CONDITIONING SYSTEM

(71) Applicant: Carrier Corporation, Palm Beach Gardens, FL (US)

(72) Inventors: Lok Sudhir Katikala, Telangana (IN); Lakshmi Bhavani Pamarthi, Telangana (IN); Karimulla Shaik, Telangana (IN); Kiran Kumar Akula, Telangana (IN); Jayanth Kumar Sunkari, Telangana (IN); Vvssuresh Garimella, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 524 days.

(21) Appl. No.: 17/952,743

(22) Filed: Sep. 26, 2022

(65) Prior Publication Data

US 2023/0097395 A1    Mar. 30, 2023

(51) Int. Cl.
| | | |
|---|---|---|
| F24F 11/46 | (2018.01) | |
| F24F 11/56 | (2018.01) | |
| F24F 11/80 | (2018.01) | |
| H04L 51/02 | (2022.01) | |
| H04L 51/216 | (2022.01) | |
| F24F 110/10 | (2018.01) | |

(52) U.S. Cl.
CPC .............. *F24F 11/46* (2018.01); *F24F 11/56* (2018.01); *F24F 11/80* (2018.01); *H04L 51/02* (2013.01); *H04L 51/216* (2022.05); *F24F 2110/10* (2018.01)

(58) Field of Classification Search
CPC ............ F24F 11/46; F24F 11/56; F24F 11/80
See application file for complete search history.

(56) References Cited

U.S. PATENT DOCUMENTS

| | | | |
|---|---|---|---|
| 9,298,196 B2 * | 3/2016 | Matsuoka | F24F 11/46 |
| 2011/0046801 A1 * | 2/2011 | Imes | F24F 11/523 |
| | | | 700/286 |
| 2013/0211783 A1 * | 8/2013 | Fisher | G05D 23/1904 |
| | | | 702/182 |
| 2015/0168002 A1 * | 6/2015 | Plitkins | F24F 11/52 |
| | | | 165/268 |

(Continued)

*Primary Examiner* — Mong-Shune Chung
(74) *Attorney, Agent, or Firm* — CANTOR COLBURN LLP

(57) ABSTRACT

A method (300) for operating a heating, ventilation, and air conditioning (HVAC) system includes an apparatus (102) to select a set point temperature and allow the HVAC system to reach the set point temperature. The apparatus (102) maintains the set point temperature for a predetermined duration and reach a first temperature by changing the setpoint temperature by a predefined value and maintain the first temperature for a first predetermined duration. The first temperature is changed by the predefined value to reach a second temperature and maintain the second temperature for a second predetermined duration. The apparatus modify the second temperature by the predefined value to reach the first temperature and maintain the first temperature for a third predetermined duration. The apparatus (102) modifies the first temperature by the predefined value to reach the set point temperature.

21 Claims, 5 Drawing Sheets

(56) References Cited

U.S. PATENT DOCUMENTS

2015/0168003 A1* 6/2015 Stefanski ................. F24F 11/64
                                                        165/268
2018/0087795 A1* 3/2018 Okita .................... H04L 12/282
2021/0131686 A1* 5/2021 Dyess ..................... F24F 11/64

* cited by examiner

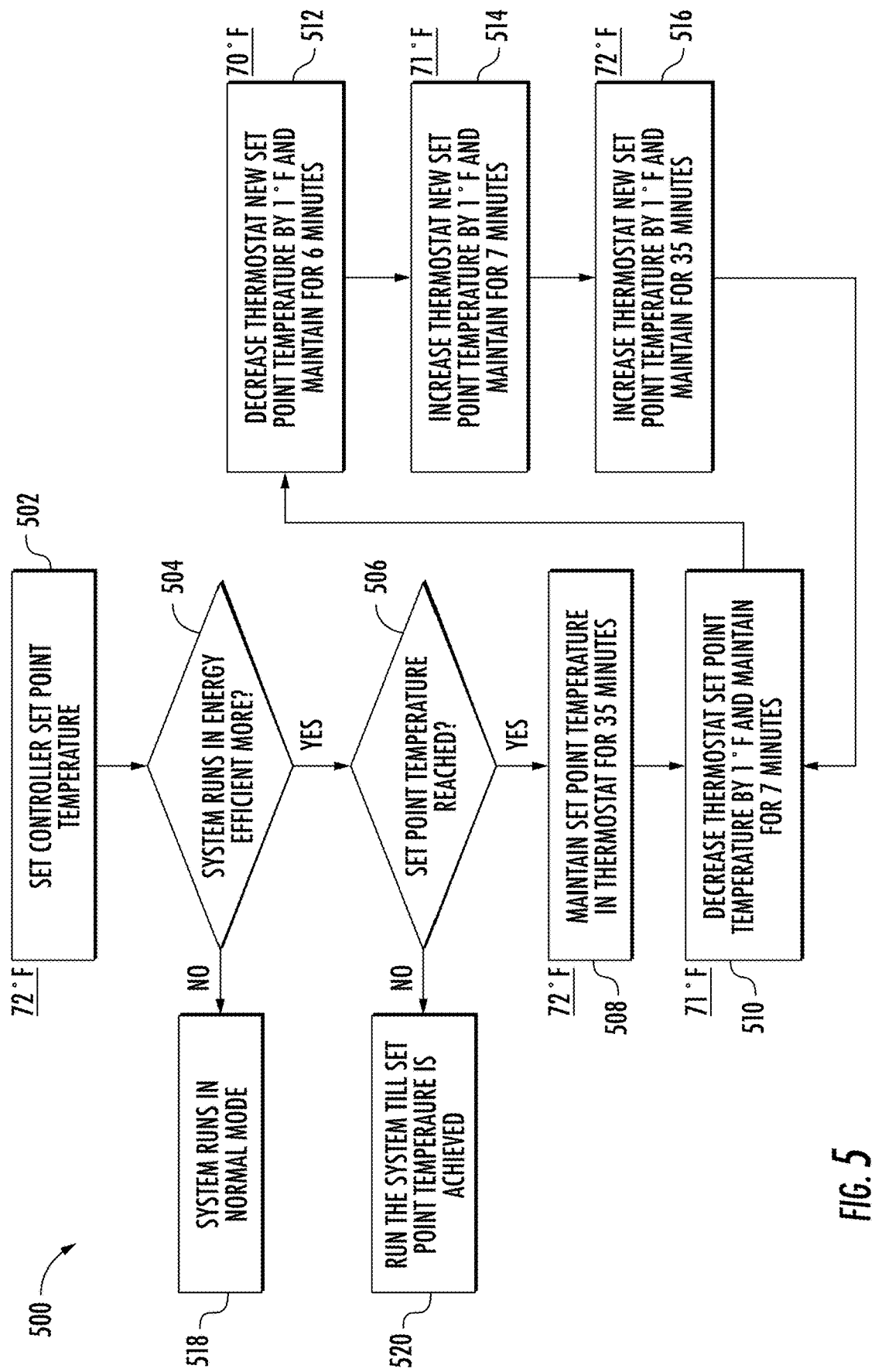

SMART ENERGY MANAGEMENT OF THE HEATING, VENTILATION, AND AIR CONDITIONING SYSTEM

FOREIGN PRIORITY

This application claims priority to Indian Patent Application No. 202111043752, filed Sep. 27, 2021, and all the benefits accruing therefrom under 35 U.S.C. § 119, the contents of which in its entirety are herein incorporated by reference.

TECHNICAL FIELD OF INVENTION

The present invention in general relates to heating, ventilation, and air conditioning (referred to hereinafter as "HVAC") system. More particularly, the invention relates to an apparatus and method for smart energy management in the HVAC system.

BACKGROUND OF THE INVENTION

The HVAC industry is continuously facing enhanced need for energy efficiency and improved comfort. The new Energy Efficiency Regulations (referred hereinafter as "EER") for energy management put more demand on the HVAC industry to increase energy efficiency. Even small energy savings at regular intervals may improve overall efficiency for the HVAC system.

Currently, the HVAC systems utilize different technologies like smart set back temperature or setup temperature in cooling & heating cycles. Some utility commands exist that are configured to receive signal from a controller on continuous basis and need to operate the thermostat manually to run the HVAC system in an energy saving mode. Typically, the thermostat is set to control the temperature at comfort conditions when the users are awake or generally occupy the space. On the other hand, the thermostat controls the temperature at energy saving conditions when users leave the space or users go to sleep.

The thermostats are based on the assumption that the temperature set point changes from the energy savings value to a comfort value of user at the programmed time, and not earlier. The thermostats incorporate Adaptive Intelligent Recovery (AIR) algorithms. The disadvantages associated with AIR algorithms is that the thermostat, in order to achieve efficient heating and cooling operation, starts the heating/cooling system before the desired time so that the actual temperature meets the desired set point temperature at the specified set point time, rather than the thermostat starting the air conditioning system at the set point time. This results in longer run of the thermostat and thus consumes a lot of energy.

In view of the above, a method and an apparatus is described which solves the problem of manually controlling the thermostat and providing the energy efficient solution without compromising the comfort of a user. There is a need for optimizing energy consumption and a smart energy management HVAC system.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Various embodiments of the invention describe a method for providing control of an apparatus such as thermostat. The method comprises selecting a set point temperature using a thermostat and allowing a heating, ventilation, and air conditioning (HVAC) system to reach the set point temperature. The set point temperature is maintained for a predetermined duration. The method also comprises changing the setpoint temperature by a predefined value to reach a first temperature and allowing the HVAC system to maintain the first temperature for a first predetermined duration. The method further comprises changing the first temperature by the predefined value to reach a second temperature and allowing the HVAC system to maintain the second temperature for a second predetermined duration. The second temperature is modified by the predefined value to reach the first temperature and the HVAC system is allowed to maintain the first temperature for a third predetermined duration. Further, the method comprises modifying the first temperature by the predefined value to reach the set point temperature.

In an embodiment of the invention, in a cooling cycle, changing the set point temperature and changing the first temperature corresponds to an increase in temperature by the predefined value.

In another embodiment of the invention, in the cooling cycle, modifying the second temperature and modifying the first temperature corresponds to a decrease in temperature by the predefined value.

In an embodiment of the invention, in a heating cycle, changing the set point temperature and changing the first temperature corresponds to a decrease in temperature by the predefined value.

In another embodiment of the invention, in the heating cycle, modifying the second temperature and modifying the first temperature corresponds to an increase in temperature by the predefined value.

In yet another embodiment of the invention, the set point temperature is input by a user through an input device.

In an embodiment of the invention, changing the set point temperature by a predefined value occurs if energy efficient mode is selected by a user using an input device.

In still another embodiment of the invention, the HVAC system runs in a normal mode if the energy efficient mode is not selected by the user.

In an embodiment of the invention, the predefined value is modified by the user using an input device.

In an embodiment of the invention, changing the set point temperature and the first temperature by the predefined value and modifying the second temperature and subsequently modifying the first temperature to reach the set point temperature occurs for a constant duration.

Various embodiments of the invention describe an apparatus for controlling temperature in a heating, ventilation, and air conditioning (HVAC) system. The apparatus is configured to select a set point temperature and allow a heating, ventilation, and air conditioning (HVAC) system to reach the set point temperature. The set point temperature is then maintained for a predetermined duration. The apparatus is further configured to change the setpoint temperature by a predefined value to reach a first temperature and allow the HVAC system to maintain the first temperature for a first predetermined duration. The first temperature changes by the predefined value to reach a second temperature and allow the HVAC system to maintain the second temperature for a second predetermined duration. The apparatus is configured to modify the second temperature by the predefined value to reach the first temperature and allow the HVAC system to maintain the first temperature for a third predetermined duration. The apparatus is configured to again modify the first temperature by the predefined value to reach the set point temperature.

In an embodiment of the invention, in a cooling cycle, the set point temperature change and the first temperature change correspond to an increase in temperature by the predefined value.

In another embodiment of the invention, in the cooling cycle, the second temperature modification and the first temperature modification correspond to a decrease in temperature by the predefined value.

In an embodiment of the invention, in a heating cycle, the set point temperature change and the first temperature change correspond to a decrease in temperature by the predefined value.

In another embodiment of the invention, in the heating cycle, the second temperature modification and the first temperature modification correspond to an increase in temperature by the predefined value.

In yet another embodiment of the invention, the set point temperature is input by a user through an input device.

In another embodiment of the invention, the setpoint temperature change by a predefined value occurs if energy efficient mode is selected by a user using an input device.

In a different embodiment of the invention, the HVAC system runs in a normal mode if the energy efficient mode is not selected by the user.

In still another embodiment of the invention, the predefined value is modified by the user using an input device.

Various embodiments of the invention also describe a computer readable medium comprising one or more processors and a memory coupled to the one or more processors, the memory storing instructions which are executed by the one or more processors, the one or more processors configured to select a set point temperature and allow a heating, ventilation, and air conditioning (HVAC) system to reach the set point temperature. The set point temperature is maintained for a predetermined duration. The one or more processors are configured to change the setpoint temperature by a predefined value to reach a first temperature and allow the HVAC system to maintain the first temperature for a first predetermined duration. The first temperature changes by the predefined value to reach a second temperature and allow the HVAC system to maintain the second temperature for a second predetermined duration. The one or more processors are configured to modify the second temperature by the predefined value to reach the first temperature and allow the HVAC system to maintain the first temperature for a third predetermined duration. The first temperature is again modified by the predefined value to reach the set point temperature.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Some of the objects of the invention have been set forth above. These and other objects, features, aspects and advantages of the present invention will become better understood with regard to the following description, appended claims and accompanying drawings where:

FIG. 5 depicts an exemplary flowchart illustrating a heating cycle to perform the invention according to an exemplary embodiment of the invention.

Corresponding reference numerals indicate corresponding parts throughout the drawings.

DETAILED DESCRIPTION OF THE INVENTION

Figure 1:
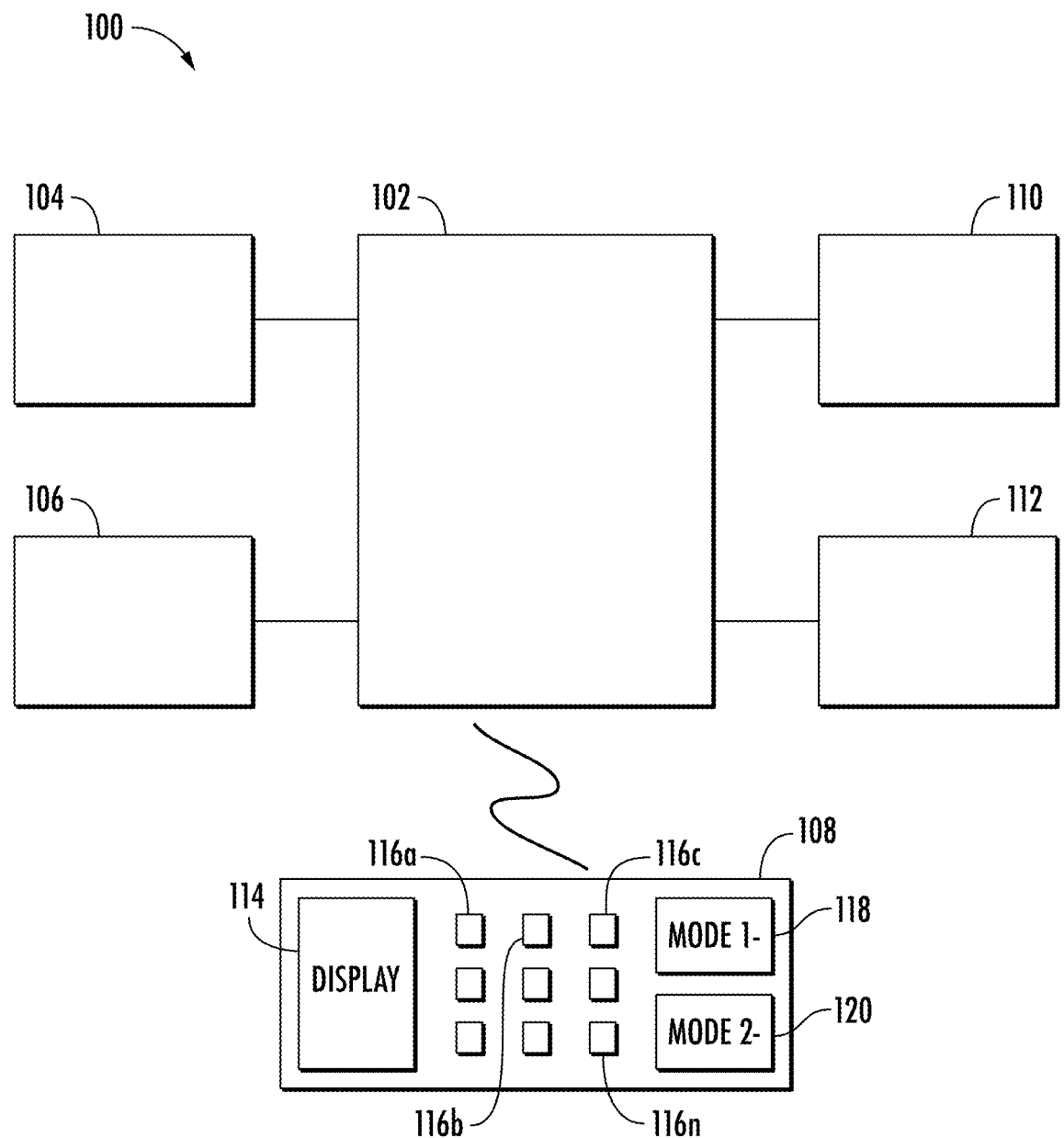
FIG. 1 depicts a system diagram for energy management of the HVAC system according to an exemplary embodiment of the invention.

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

The present invention relates to an apparatus and a method for smart energy management of heating, ventilation, and air conditioning (HVAC) system. The method of the present invention comprises selecting a set point temperature using a thermostat and allowing the HVAC system to reach the set point temperature. The set point temperature is maintained for a predetermined duration. After the predetermined duration, the set point temperature is changed by a predefined value to reach a first temperature and allow the HVAC system to maintain the first temperature for a first predetermined duration. The first temperature is changed by the predefined value to reach a second temperature and allow the HVAC system to maintain the second temperature for a second predetermined duration. The second temperature is then modified by the predefined value to reach the first temperature and the HVAC system is allowed to maintain the first temperature for a third predetermined duration. The first temperature is then modified by the predefined value to reach the set point temperature.

The HVAC system of the present invention runs the cycle for changing the temperature of the HVAC system 100 at different comfort levels i.e., different than the set point temperature compromising on a user comfort level for a short time and then turning back to the set point temperature. Therefore, with optimized comfort, the energy consumption of the HVAC system reduces. A 1° F. (Fahrenheit) change in the set point temperature brings in an overall energy saving of 1%-3%. Further, compressor life is improved due to reduction in short cycling. Also, long running of the compressor helps in better dehumidification and the HVAC system becomes energy efficient.

The predefined value as described herein may be a step size increase or decrease in the temperature for example, by 1° F. or 2° F. and the like. The predefined value may be a discrete integer value or a fraction thereof.

It may be noted that an apparatus (hereinafter "thermostat") is interchangeably known as an apparatus that controls the temperature of the HVAC system and runs both heating and cooling cycles. The thermostat comprises a controller which provides control for the HVAC system. The thermostat generally runs in different modes i.e.—in a normal mode as well as in an energy efficient mode and the like.

The thermostat is communicably coupled to a mobile device, controller/s, sensors, an input device (s), and the like. It may also communicate to a wireless network such as, but not limited to, Bluetooth, Infrared, Wi-Fi, Mobile Internet, Zigbee, or any other known wireless network. The sensors may be configured to sense temperature, humidity, motion, ambient light, proximity etc. The thermostat is further communicably coupled to a processor that may be a microprocessor, an ARM based processor, a microcontroller, a controller, a central processing unit or any other computational capability device. The thermostat may comprise an inbuilt memory or configured to communicably coupled to an external database to save and retrieve data as well as instructions.

The input device may be a wireless device like a remote or a panel coupled to the thermostat using which the user may provide input to the thermostat. The input may be setting of the set point temperature, mode selection, setting timer, selecting the heating/cooling cycle etc. The thermostat may also be configured using input from a mobile based application on a tablet, a computer, a laptop, a mobile or any other computational device. The thermostat may require to change a predefined value or a predetermined temperature based on various factors like the user requirement, outside temperature, humidity, season etc.

FIG. 1 is a schematic diagram of a HVAC system 100 in accordance with the embodiments of the present invention. The HVAC system 100 comprises a thermostat 102 communicably coupled to one or more sensors 104, a power supply 106, controller/s and/or actuator/s 110, heating/cooling components 112, an input device 108 etc. The sensors 104 may comprise temperature sensors and humidity sensors. The temperature and humidity sensors may sense temperature and humidity of an enclosed surrounding and open atmosphere respectively, and pass temperature and humidity data to the thermostat 102. The thermostat 102 controls an actuator system (comprises a number of actuators) 110. The actuator system 110 may provide position feedback to the thermostat 102. The actuator system 110 is configured to control an amount of air that flows through vanes or other air-flow devices (e.g., the amount of air that flows from the duct into the room). The input device 108 is provided to allow the user to set the desired room temperature, interchangeably called the set point temperature. The input device is provided with various modes for example, a first mode 118 as a normal mode and a second mode 120 as an energy efficient mode. Either of the modes is selected by the user to run the HVAC system. The mode and the set point temperature set by the user are displayed on a display 114 of the input device 108. There may be buttons like 116a, 116b . . . 116n (together known as 116) on the input device 108 which are used to select one or more parameters for running the HVAC system 100. The parameters may be a heating mode, a cooling mode, a sleep mode, an increase button, a decrease button, a timer, number keys etc. The power supply 106 provides power to the thermostat 102, the controller 110, the input device 108, the sensors 104, and the heating and/or cooling 112 and/or ventilation components as needed. In one embodiment, an optional auxiliary power supply 106 is also provided to provide additional power. The auxiliary power supply is a supplementary source of electrical power, such as, for example, a battery, a solar cell, an airflow (e.g., wind-powered) generator, the fan acting as a generator, a nuclear-based electrical generator, a fuel cell, a thermocouple, etc. The HVAC system may further include more components and devices to control the heating and cooling cycles described herein.

Figure 2:
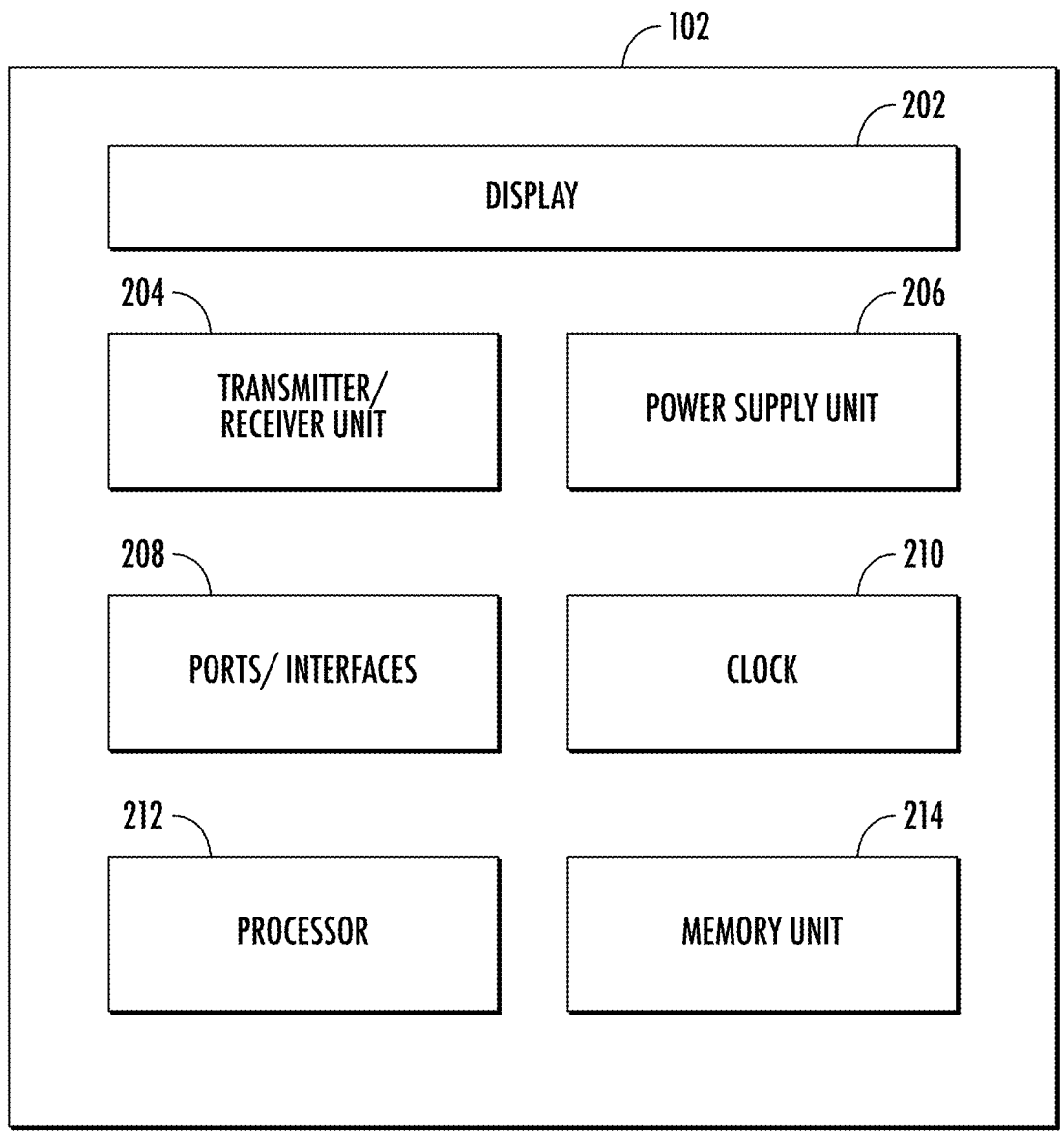
FIG. 2 depicts a block diagram of apparatus according to an exemplary embodiment of the invention.

FIG. 2 is a block diagram of the thermostat 102 in accordance with embodiments of the present invention. The thermostat 102 comprises a display 202, a transmitter/receiver unit 204, a power supply unit 206, ports/interfaces 208, a clock 210, at least one processor 212, a memory unit 214 etc. The processor 212 includes a central processing unit (CPU) in communication with the memory 214. The memory unit 214 stores data and instructions via inputs received from sensors 104, inputs received using the user interface 208, from CPU, the input device 108, the display 202 or any other suitable means. The memory unit 214 may include partially a read-only memory which is factory-programmed and partially a random-access memory which stores data subject to change during operation. A settable real time clock 210 is used to set time in the thermostat 102 to facilitate operations. The thermostat 102 may be suitably powered by the power supply unit 206 connected to the external power supply 106. The transmitter/receiver unit 204 include a communication interface for coordinating communications between the CPU and the input device 108, the sensors 104, the controllers/actuators 110, the heating/cooling components 112, the memory 214 etc. The ports/interfaces 208 may be used to reprogram or update the instructions and/or data stored in the memory 214 of the thermostat 102.

In some embodiments, the thermostat 102 is configured to control temperature of a heating, ventilation, and air conditioning (HVAC) system 100. The thermostat 102 is configured to select a set point temperature and allow the HVAC system 100 to reach the set point temperature. The set point temperature is maintained for a predetermined duration of time. The setpoint temperature is then changed by a predefined value to reach a first temperature and the thermostat allow the HVAC system 100 to maintain the first temperature for a first predetermined duration. The first temperature is changed by the predefined value to reach a second temperature and allows the HVAC system to maintain the second temperature for a second predetermined duration. The second temperature is modified by the predefined value to turn back the first temperature and the thermostat 102 allows the HVAC system to maintain the first temperature for a third predetermined duration. The first temperature is again modified by the predefined value to reach the set point temperature.

In an embodiment, the set point temperature is provided to the thermostat 102 by the user through an input device 108. The user may also select the mode in which the HVAC system 100 is required to function. If the user does not select any mode, the HVAC system by default runs in the normal mode. The user may select the energy efficient mode using the input device 108. The setpoint temperature changes by the predefined value if the energy efficient mode is selected by the user using the input device 108. If the energy efficient mode is not selected by the user, the HVAC system 100 runs in the normal mode. In the energy efficient mode, the HVAC system either runs a cooling cycle or a heating cycle.

In an embodiment, the user selects the energy efficient mode. The thermostat 102 further receives an input from the input device 108 regarding the selection of the cooling cycle. In the cooling cycle, the set point temperature change and the first temperature change correspond to an increase in temperature by the predefined value. In an embodiment, in the cooling cycle, the second temperature modification and the first temperature modification correspond to a decrease in temperature by the predefined value.

In an embodiment, in a heating cycle, the set point temperature change and the first temperature change correspond to a decrease in temperature by the predefined value. In an embodiment, in the heating cycle, the second temperature modification and the first temperature modification correspond to an increase in temperature by the predefined value. This allows the HVAC system 100 to run for some duration of the heating or cooling cycle (20%-30%) away from the set point temperature to gain energy savings. Further by implementing the present invention, the user is informed about the comfort level and the power savings in advance. As a result, the user may choose to run the HVAC system 100 in the normal mode or the power saving mode.

Figure 3:
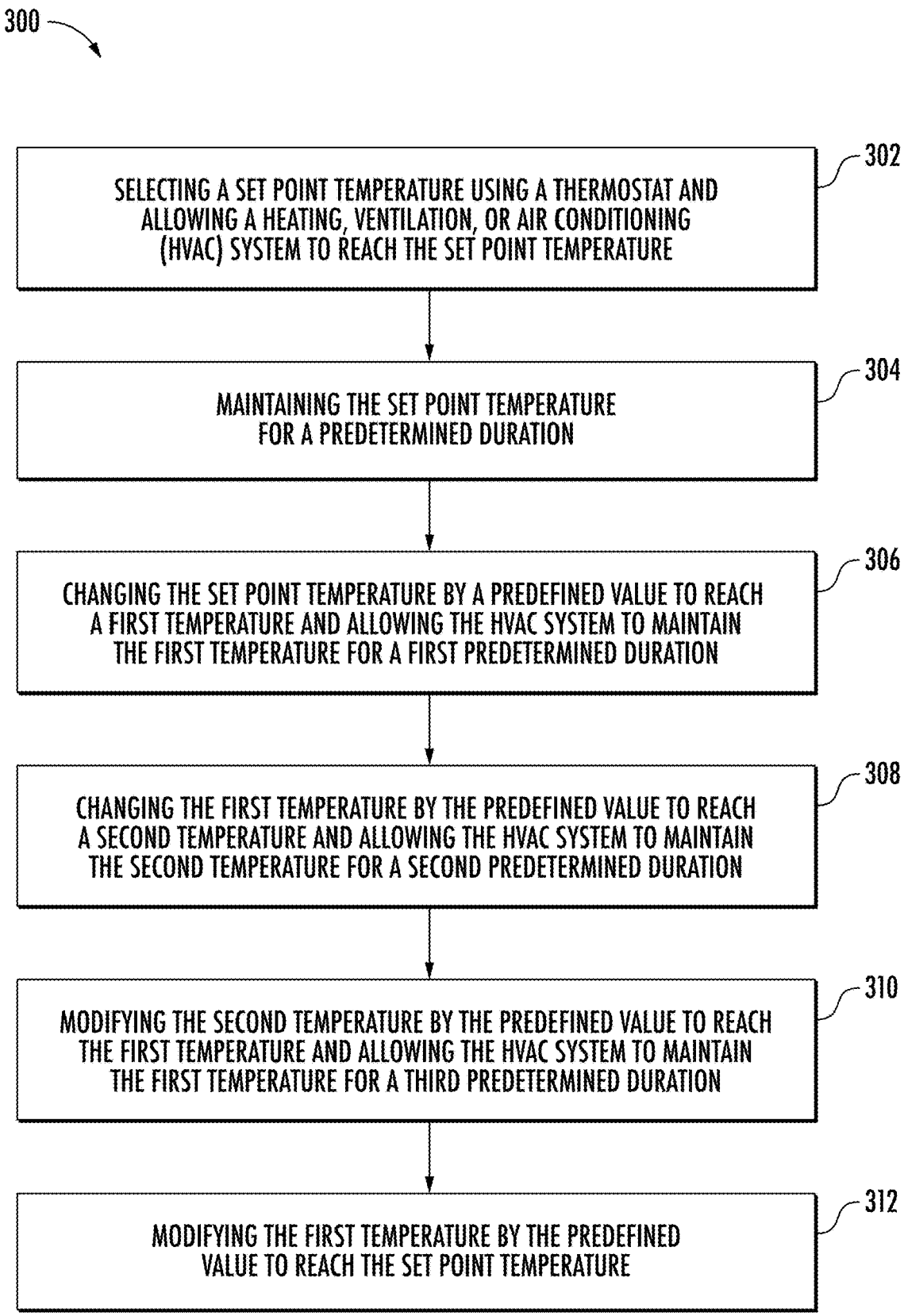
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart describes a method being performed to control an enclosed surrounding temperature in the HVAC system 100 to make the HVAC system energy efficient. The method starts at 302 by selecting a set point temperature using a thermostat and allowing the HVAC system 100 to reach the set point temperature.

At step 304, the set point temperature is maintained for a predetermined duration. The predetermined duration is considered as the duration during which the temperature of the enclosed surrounding, the enclosed surrounding is where the HVAC system is arranged to control surrounding temperature, reaches the set point temperature.

At step 306, after maintaining the set point temperature for the predetermined duration, the set point temperature is changed by a predefined value to reach a first temperature and allow the HVAC system to maintain the first temperature for a first predetermined duration.

At step 308, the first temperature is changed by the predefined value to reach a second temperature and allows the HVAC system to maintain the second temperature for a second predetermined duration.

At step 310, the second temperature is modified by the predefined value to reach back to the first temperature and allows the HVAC system to maintain the first temperature for a third predetermined duration.

At step 312, the first temperature is again modified by the predefined value to reach back to the set point temperature.

The predefined value in the present invention may be modified by the user if required, using the input device 108.

In an exemplary embodiment defined below in tables 1 and 2, the method 300 is defined by taking exemplary values in detail. Exemplary values defined in the following tables are in terms of ° F., however the various other values may be used like Celsius which are also within the scope of the present invention.

Figure 4:
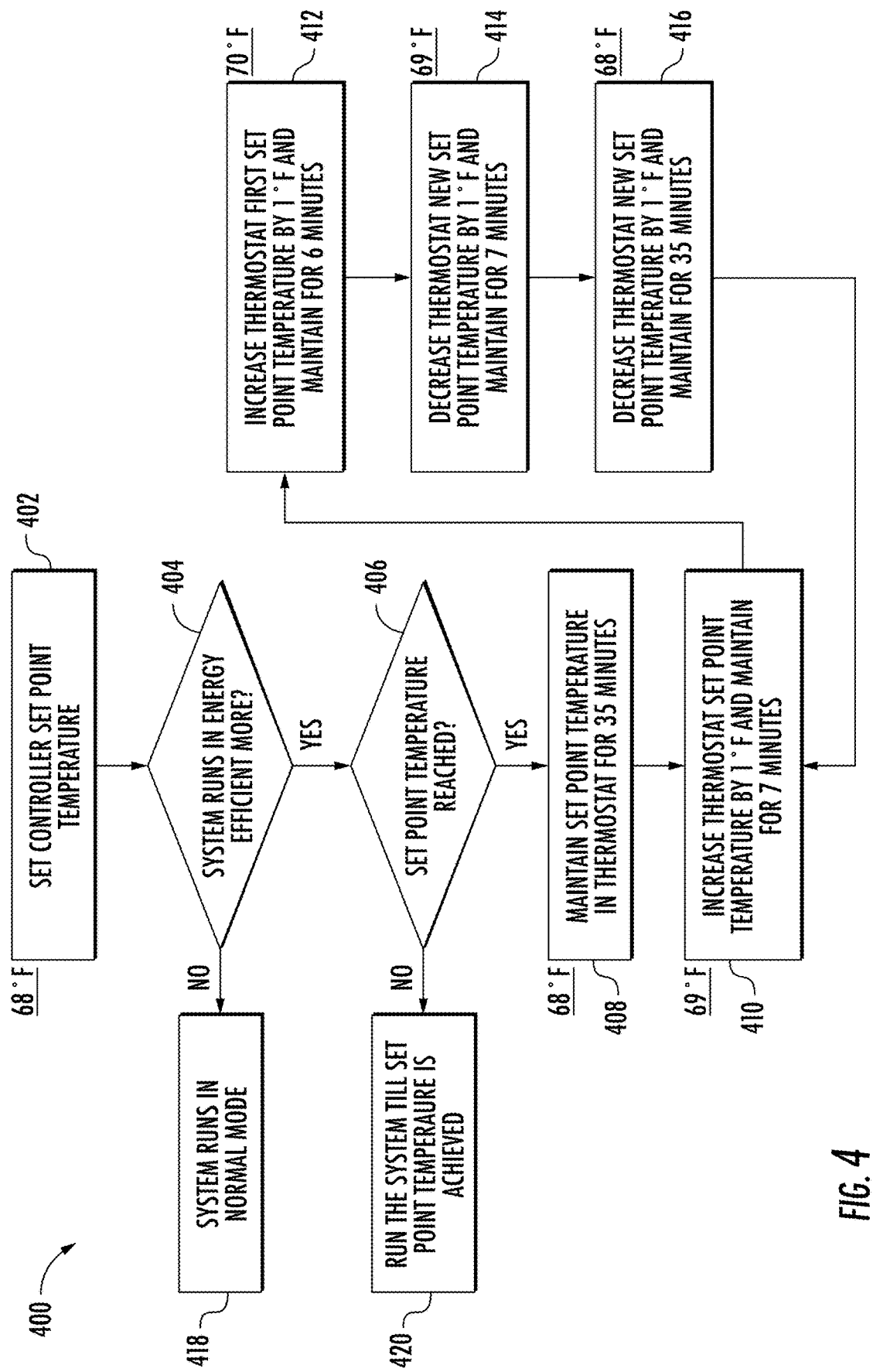
FIG. 4 depicts an exemplary flowchart illustrating a cooling cycle to perform the invention according to an exemplary embodiment of the invention.

FIG. 4 depicts a flowchart 400 outlining the cooling cycle 400 of the invention in an exemplary embodiment of the invention. When the user selects to run the cooling cycle 400 of the HVAC system 100, the user provides input using the input device 108 to the thermostat 102 according to step 402. For an example, let us assume that the thermostat is set at the set point temperature at 68° F. At step 404, the processor 212 checks if the mode 2 i.e.—the energy efficient mode is selected by the user to run the HVAC system 100 to save power. If the HVAC system 100 runs in the normal mode, as in step 418, the HVAC system works normally at the user comfort level without saving any energy or power. The set point temperature is also called user comfort temperature/level. If the user selects the energy efficient mode, the HVAC system 100 runs to achieve the set point temperature, example 68° F., as disclosed at step 420. At step 406, the processor 212 keeps checking the enclosed surrounding temperature until it reaches the set point temperature 68° F. At step 408, the thermostat is maintained at the set point temperature 68° F. for a predetermined duration for example 35 minutes. At step 410, the set point temperature 68° F. at the thermostat is increased by 1° F. to become 69° F. as the first temperature and is maintained for 7 minutes (predetermined duration). At step 412, the thermostat again increases the temperature by 1° F. to become 70° F. known as the second temperature and is maintained for 6 minutes. At step 414, the second temperature is decreased by 1° F. to become 69° F. and is again maintained for 7 minutes. At step 416, the first temperature is again decreased by 1° F. to become 68° F. as the initial set point temperature and is maintained for 35 minutes thereby completing the cooling cycle. In this way the cooling cycle keeps repeating and diverting from the comfort level temperature of the user for about 22% of times and saves almost 1% to 3% of energy for each degree shift from the comfort temperature of the user. Therefore, the HVAC system 100 becomes an energy efficient system by implementing the cooling cycle as per the present invention.

Table-1 below describes various experimental results to show the features of the cooling cycle in an energy efficient mode disclosed in the present invention.

TABLE 1

Smart Energy Management Control - Cooling Cycle

| | Temp (F.) | Duration (Mins) | Steps |
| --- | --- | --- | --- |
| Set Temperature (A) | 68 | 35 | Step 1: System initially runs in the normal mode to reach the set temperature and maintains at this temperature for a defined duration. |
| New Set Temperature (A + 1) | 69 | 7 | Step 2: After running the system and meeting the Step-1 criteria, the set point changes by 1-degree F. |
| New Set Temperature (A + 2) | 70 | 6 | Step 3: After running the system and meeting the Step-2 criteria, the set point changes by 1-degree F. |
| New Set Temperature (A + 1) | 69 | 7 | Step 4: After running the system and meeting the Step-3 criteria, the set point changes by 1-degree F. |
| Set Temperature (A) | 68 | 35 | Step 5: After running the system and meeting the Step- |

TABLE 1-continued

Smart Energy Management Control - Cooling Cycle

| | Temp (F.) | Duration (Mins) | Steps |
|---|---|---|---|
| | | | 4criteria, the set point changes by 1-degree F. and the cycle repeats again. |
| 1 Cycle | | 90 | |
| % of time away from comfort temperature | | 22% | |

In addition to the method 400, the experimental data shown in table 1 discloses the cooling cycle 400. The HVAC system 100 by default runs in the normal mode. At step 1, the set point temperature provided by the user through the input device 108 to the thermostat 102 is for example considered as A=68° F. and maintained for a predetermined duration of 35 minutes. At step 2, a new set temperature/the first temperature (A+1) is set by increasing the temperature by 1° F. to become 69° F. and maintained for 7 minutes. At step 3, a new temperature/the second temperature (A+2) is set by increasing the first temperature further by 1° F. to become 70° F. and maintained for 6 minutes. At step 4, a new temperature/the first temperature (A+1) is set back by decreasing the second temperature by 1° F. to become 69° F. and maintained for 7 minutes. At step 5, a set point temperature (A) is set back by decreasing the first temperature again by 1° F. to become 68° F. and maintained for 35 minutes. This allows the HVAC system 100 to run the cooling cycle 400 22% of times away from the set comfort temp to gain energy savings.

FIG. 5 depicts a flowchart 500 outlining the heating cycle 500 of the invention in an exemplary embodiment of the invention. When the user selects to run the heating cycle 500 of the HVAC system 100, the user provides input using the input device 108 to the thermostat 102 according to step 502. For an example, let us assume that the thermostat is set at the set point temperature of 72° F. At step 504, the processor 212 checks if the user wants to run the HVAC system 100 in the energy efficient mode. If the user is not interested, the HVAC system 100 runs in the normal mode, as in step 518 and the HVAC system works normally at the user comfort level without saving any energy. The set point temperature is also called user comfort temperature/level. If the user selects the energy efficient mode, the HVAC system 100 runs to achieve the set point temperature, example 72° F., as disclosed at step 520. At step 506, the processor 212 keeps checking the enclosed surrounding temperature until it reaches the set point temperature 72° F. At step 508, the thermostat is maintained at the set point temperature 72° F. for a predetermined duration for example 35 minutes. At step 510, the set point temperature 72° F. at the thermostat is decreased by 1° F. to become 71° F. as the first temperature and is maintained for 7 minutes (predetermined duration). At step 512, the thermostat again decreases the temperature by 1° F. to become 70° F. known as the second temperature and is maintained for 6 minutes. At step 514, the second temperature is increased by 1° F. to become 71° F. and is again maintained for 7 minutes. At step 516, the first temperature is again increased by 1° F. to become 72° F. as the initial set point temperature and is maintained for 35 minutes thereby completing the heating cycle. In this way the heating cycle keeps repeating and diverting from the comfort level temperature of the user for 22% of times and saves almost 1% to 3% of energy for each degree shift from the comfort temperature of the user. Therefore, the HVAC system 100 becomes an energy efficient system by implementing the heating cycle as per the present invention.

Table-2 below describes various experimental results to show the features of the heating cycle in an energy efficient mode disclosed in the present invention.

In addition to the method 500, the experimental data shown in table 2 discloses the heating cycle 500. The HVAC system 100 by default runs at the normal mode. At step 1, the set point temperature provided by the user through the input device 108 to the thermostat 102 is for example considered as A=72° F. and maintained for a predetermined duration of 35 minutes.

TABLE 2

Smart Energy Management Control - Heating Cycle

| | Temp (F.) | Duration (Mins) | Steps |
|---|---|---|---|
| Set Temperature (A) | 72 | 35 | Step 1: System initially runs in normal mode to reach set temperature and maintains at this temperature for defined duration. |
| New Set Temperature (A − 1) | 71 | 7 | Step 2: After running the system and meeting the Step-1 criteria, the set point changes by 1-degree F. |
| New Set Temperature (A − 2) | 70 | 6 | Step 3: After running the system and meeting the Step-2 criteria, the set point changes by 1-degree F. |
| New Set Temperature (A − 1) | 71 | 7 | Step 4: After running the system and meeting the Step-3 criteria, the set point changes by 1-degree F. |
| Set Temperature (A) | 72 | 35 | Step 5: After running the system and meeting the Step-4criteria, the set point changes by 1-degree F. and the cycle repeats again. |
| 1 Cycle | | 90 | |
| % of time away from comfort | | 22% | |

TABLE 2-continued

Smart Energy Management Control - Heating Cycle

| Temp (F.) | Duration (Mins) | Steps |
|---|---|---|
| temperature | | |

At step 2, a new set temperature/the first temperature (A-1) is set by decreasing the temperature by 1° F. to become 71° F. and maintained for 7 minutes. At step 3, a new temperature/the second temperature (A-2) is set by decreasing the first temperature further by 1° F. to become 70° F. and maintained for 6 minutes. At step 4, a new temperature/the first temperature (A-1) is set back by increasing the second temperature by 1° F. to become 71° F. and maintained for 7 minutes. At step 5, a set point temperature (A) is set back by increasing the first temperature again by 1° F. to become 72° F. and maintained for 35 minutes. This allows the HVAC system 100 to run the heating cycle 500 22% times i.e.—20 minutes per 1 hour 30 mins away from the set comfort temp to gain energy savings.

In an embodiment, the HVAC system 100 may communicate with a computing device and may receive the inputs from the HVAC system 100. In an embodiment, a computer readable medium comprises one or more processors and a memory coupled to the one or more processors. The memory store instructions which are executed by the one or more processors, the one or more processors configured to select a set point temperature, using a thermostat and allow a heating, ventilation, and air conditioning (HVAC) system to reach the set point temperature. The set point temperature is maintained for a predetermined duration. After the predetermined duration, the one or more processors are configured to change the set point temperature by a predefined value to reach a first temperature and allow the HVAC system to maintain the first temperature for a first predetermined duration. The one or more processors are configured to change the first temperature by the predefined value to reach a second temperature and allow the HVAC system to maintain the second temperature for a second predetermined duration. The second temperature is then modified by the predefined interval to reach the first temperature and allow the HVAC system to maintain the first temperature for a third predetermined duration. The first temperature is then modified by the predefined interval to reach the set point temperature.

The increase and decrease in temperature values are exemplary and instead of a 1° F. change, other values or step size to change the temperature may be adopted. Similarly, the predetermined duration may be modified based on the location and user requirement. Moreover, the predetermined duration at each step may be same or different and is within the scope of the invention.

The HVAC system of the present invention runs the cycle for deviating the temperature of the HVAC system 100 at a different comfort level i.e., different than set point temperature compromising on the user comfort and then turning back to the set point temperature. Therefore, with optimized comfort, the energy consumption of the HVAC system reduces. Even a 1° change in the set point temperature brings in an overall energy saving of 1%-3%. Further, in the present invention a compressor life is improved due to reduction is short cycling. Also, long running of the compressor helps in better dehumidification and is energy efficient.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purposes or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The present invention is applicable to various facilities such as, but not limited to, hospitals, hostels, resorts, industries, houses, educational institutes etc., and any such application that is well known in the art.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   selecting a set point temperature using a thermostat and allowing a heating, ventilation, and air conditioning (HVAC) system to reach the set point temperature;
   maintaining the set point temperature for a predetermined duration;
   without user input, changing the setpoint temperature by a predefined value to reach a first temperature and allowing the HVAC system to maintain the first temperature for a first predetermined duration;
   without user input, changing the first temperature by the predefined value to reach a second temperature and allowing the HVAC system to maintain the second temperature for a second predetermined duration;
   without user input, modifying the second temperature by the predefined value to reach the first temperature and allowing the HVAC system to maintain the first temperature for a third predetermined duration; and
   without user input, modifying the first temperature by the predefined value to reach the set point temperature.

2. The method of claim 1, wherein in a cooling cycle, changing the set point temperature and changing the first temperature corresponds to an increase in temperature by the predefined value.

3. The method of claim 2, wherein the set point temperature is input by a user through an input device.

4. The method of claim 1, wherein in a cooling cycle, modifying the second temperature and modifying the first temperature corresponds to a decrease in temperature by the predefined value.

5. The method of claim 1, wherein in a heating cycle, changing the set point temperature and changing the first temperature corresponds to a decrease in temperature by the predefined value.

6. The method of claim 1, wherein in a heating cycle, modifying the second temperature and modifying the first temperature corresponds to an increase in temperature by the predefined value.

7. The method of claim 1, wherein changing the setpoint temperature by a predefined value occurs if energy efficient mode is selected by a user using an input device.

8. The method of claim 7, wherein the HVAC system runs in a normal mode if the energy efficient mode is not selected by the user.

9. The method of claim 1, wherein the predefined value is modified by the user using an input device.

10. The method of claim 1, wherein changing the set point temperature and the first temperature by the predefined value and modifying the second temperature and subsequently modifying the first temperature to reach the set point temperature occurs for a constant duration.

11. The method of claim 1, wherein the first temperature is different than a setpoint temperature for the current time.

12. An apparatus for controlling temperature in a heating, ventilation, and air conditioning (HVAC) system, the apparatus configured to:
    select a set point temperature and allow a heating, ventilation, or air conditioning (HVAC) system to reach the set point temperature;
    maintain the set point temperature for a predetermined duration;
    without user input, change the setpoint temperature by a predefined value to reach a first temperature and allow the HVAC system to maintain the first temperature for a first predetermined duration;
    without user input, change the first temperature by the predefined value to reach a second temperature and allow the HVAC system to maintain the second temperature for a second predetermined duration;
    without user input, modify the second temperature by the predefined value to reach the first temperature and allow the HVAC system to maintain the first temperature for a third predetermined duration; and
    without user input, modify the first temperature by the predefined value to reach the set point temperature.

13. The apparatus of claim 12, wherein in a cooling cycle, the set point temperature change and the first temperature change correspond to an increase in temperature by the predefined value.

14. The apparatus of claim 13, wherein the set point temperature is input by a user through an input device.

15. The apparatus of claim 12, wherein in a cooling cycle, the second temperature modification and the first temperature modification correspond to a decrease in temperature by the predefined value.

16. The apparatus of claim 12, wherein in a heating cycle, the set point temperature change and the first temperature change correspond to a decrease in temperature by the predefined value.

17. The apparatus of claim 12, wherein in a heating cycle, the second temperature modification and the first temperature modification correspond to an increase in temperature by the predefined value.

18. The apparatus of claim 12, wherein the setpoint temperature change by a predefined value happens if energy efficient mode is selected by a user using an input device.

19. The apparatus of claim 18, wherein the HVAC system runs in a normal mode if the energy efficient mode is not selected by the user.

20. The apparatus of claim 12, wherein the predefined value is modified by the user using an input device.

21. A non-transitory computer readable medium comprising a memory, the memory storing instructions which are executed by one or more processors, the one or more processors configured to:
- select a set point temperature and allowing a heating, ventilation, and air conditioning (HVAC) system to reach the set point temperature;
- maintain the set point temperature for a predetermined duration;
- without user input, change the setpoint temperature by a predefined value to reach a first temperature and allowing the HVAC system to maintain the first temperature for a first predetermined duration;
- without user input, change the first temperature by the predefined value to reach a second temperature and allowing the HVAC system to maintain the second temperature for a second predetermined duration;
- without user input, modify the second temperature by the predefined value to reach the first temperature and allowing the HVAC system to maintain the first temperature for a third predetermined duration; and
- without user input, modify the first temperature by the predefined value to reach the set point temperature.

\* \* \* \* \*